(12) United States Patent
Sheng et al.

(10) Patent No.: US 9,748,782 B1
(45) Date of Patent: Aug. 29, 2017

(54) POWER ADAPTER CHARGING MODIFICATION BASED ON A FEEDBACK LOOP

(71) Applicant: GOOGLE INC., Mountain View, CA (US)

(72) Inventors: Honggang Sheng, Milpitas, CA (US); Mark D. Hayter, Menlo Park, CA (US); Choon Ping Chng, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 320 days.

(21) Appl. No.: 14/594,512

(22) Filed: Jan. 12, 2015

(51) Int. Cl.
*H02J 7/00* (2006.01)

(52) U.S. Cl.
CPC ............ *H02J 7/0052* (2013.01); *H02J 7/007* (2013.01); *H02J 7/0047* (2013.01); *H02J 2007/0059* (2013.01); *H02J 2007/0062* (2013.01)

(58) Field of Classification Search
CPC ........ H02J 7/0052; H02J 7/0047; H02J 7/007; H02J 2007/0059; H02J 2007/0062
USPC ....................................................... 320/107
See application file for complete search history.

(56) References Cited

U.S. PATENT DOCUMENTS

| | | | |
|---|---|---|---|
| 4,652,987 A | 3/1987 | Matthews et al. | |
| 5,995,024 A | 11/1999 | Kambayashi et al. | |
| 7,274,175 B2 | 9/2007 | Manolescu | |
| 7,612,527 B2 | 11/2009 | Hoffman et al. | |
| 7,989,981 B2 | 8/2011 | Zhang | |
| 8,232,785 B2 | 7/2012 | Sun | |
| 8,572,420 B2 | 10/2013 | Dutton et al. | |
| 2009/0267562 A1* | 10/2009 | Guccione | H02J 7/0054 320/114 |
| 2010/0181840 A1 | 7/2010 | Coulson et al. | |
| 2012/0086694 A1 | 4/2012 | Tseng et al. | |
| 2013/0238048 A1* | 9/2013 | Almendinger | A61N 1/3787 607/40 |
| 2014/0091752 A1 | 4/2014 | Serrano | |
| 2015/0249354 A1* | 9/2015 | Lim | H02J 7/0052 307/1 |

OTHER PUBLICATIONS

"Universal Serial Bus Power Delivery Specification", Revision 2.0, V1.0, Aug. 11, 2014, 534 pages.
"Universal Serial Bus Type-C Cable and Connector Specification", Release 1.0, Aug. 11, 2014, 1-171 pages.

* cited by examiner

Primary Examiner — Nathaniel Pelton
(74) Attorney, Agent, or Firm — Brake Hughes Bellermann LLP

(57) ABSTRACT

A power brick includes a power module configured to convert AC to DC, an interface coupled to a computing device and configured to communicate with the computing device, and a controller. The controller is configured to receive a modified power setting and at least one modified error threshold value via the interface, control a modification of a power setting associated with the power module, and control a modification of a protection value of the power brick based on the at least one modified error threshold value.

20 Claims, 6 Drawing Sheets

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | V$_{BUS}$ | CC1 | D+ | D− | SBU1 | V$_{BUS}$ | RX2− | RX2+ | GND |
| GND | RX1+ | RX1− | V$_{BUS}$ | SBU2 | D− | D+ | CC2 | V$_{BUS}$ | TX2− | TX2+ | GND |
| B12 | B11 | B10 | B9 | B8 | B7 | B6 | B5 | B4 | B3 | B2 | B1 |

POWER ADAPTER CHARGING MODIFICATION BASED ON A FEEDBACK LOOP

TECHNICAL FIELD

Embodiments relate to power adaptors, wall chargers or power bricks for charging batteries associated with computing devices.

BACKGROUND

Generally, in traditional consumer device applications (e.g., smartphone, laptop, tablet, and the like), charging a battery associated with the consumer device can include using a power adaptor, a wall charger and/or a power brick (herein after referred to as a power brick) that is communicatively isolated from the consumer device.

Power bricks can pose significant safety risks and/or an unsatisfactory user experience can be caused by an over temperature protection, over voltage protection, over current protection, and the like. Further, the protection mechanisms provided by the consumer device may be independent of, and unsynchronized with, the protection mechanisms for the power brick itself, such that if a protection mechanism is triggered on one of the power brick or the consumer device, undesirable conditions can be reached on the other device. The protection mechanisms associated with the power brick and/or the consumer device can be based on fixed thresholds that are independent of current power brick and/or consumer device use or conditions. In addition, should the protection mechanisms for the power brick and/or the consumer device fail, the other element is not informed there has been a failure which can lead to undesirable performance.

SUMMARY

In a general aspect, a power brick includes a power module configured to convert AC to DC, an interface coupled to a computing device and configured to communicate with the computing device, and a controller. The controller is configured to receive a modified power setting and at least one modified error threshold value via the interface, control a modification of a power setting associated with the power module, and control a modification of a protection value of the power brick based on the at least one modified error threshold value.

Implementations can include one or more of the following features. For example, the controller can be configured to transmit at least one default error threshold value associated with the power brick to the computing device via the interface. The controller can be configured to use a Biphase Mark Coding (BMC) scheme when communicating with the computing device via the interface. For example, the power brick further a detector configured to monitor at least one of temperature, power, current or voltage associated with the power brick and configured to communicate at least one of the temperature, the power, the current and the voltage to the controller, wherein the controller is further configured to reduce a power output of the power brick upon determining at least one of the temperature, the power, the current and the voltage exceeds a corresponding modified error threshold value.

The controller can include a power disconnect module configured to reduce a power output of the power brick, and a local error module configured to determine at least one of a temperature, a power, a current and a voltage of the power brick exceeds a corresponding threshold and upon determining the at least one of temperature, power, current and voltage of the power brick can exceed the corresponding threshold communicate an instruction to the power disconnect module to reduce the power output. For example, the power setting can exceed a rated power setting of the power brick, and the at least one modified error threshold value can be based on enabling the power brick to output power that exceeds the rated power setting. The interface can be associated with a Universal Serial Bus (USB) protocol, the USB protocol can define a plurality of contacts configured to form the at least two data paths, and one of the plurality of contact can be configured as a control path. The controller can be further configured to reset the protection value of the power brick to a default value upon determining the computing device has been disconnected from the power brick.

In another general aspect a method included receiving a power setting and at least one modified error threshold value by a power brick, controlling a modification of a power setting associated with the power brick based on the power setting, and controlling a modification of a protection value of the power brick based on the at least one modified error threshold value.

Implementations can include one or more of the following features. For example, the method can further include monitoring at least one of a temperature, a power, a current and a voltage associated with the power brick, and reducing a power output of the power brick upon determining at least one of the temperature, the power, the current and the voltage exceeds a corresponding modified error threshold value. The method can further include monitoring at least one of a temperature, a power, a current and a voltage associated with the power brick, and communicating at least one of the temperature, the power, the current and the voltage to a computing device communicatively coupled to the power brick. The method can further include receiving a modified power setting by the power brick, and reducing a power output of the power brick based on the modified power setting. For example, the power setting can exceed a rated power setting of the power brick, and the at least one modified error threshold value is based on enabling the power brick to output power that exceeds the rated power setting. The method can further include resetting the protection value of the power brick to a default value upon determining the computing device has been disconnected from the power brick.

In still another general aspect a computing device includes an interface coupled to a power brick and configured to communicate with the power brick, and a controller. The controller is configured to determine a power setting associated with providing power to the computing device, determine at least one modified error threshold value for the power brick based on the power setting, and control communicating the power setting and the at least one modified error threshold value to the power brick via the interface.

Implementations can include one or more of the following features. For example, the controller can be configured to receive at least one default error threshold value associated with the power brick via the interface. The controller can be configured to use a Biphase Mark Coding (BMC) scheme when communicating with the power brick via the interface. For example, the controller can include a charge disconnect module configured to reduce a power input to a battery, and a local error module configured to determine at least one of a temperature, a power, a current and a voltage associated with charging the battery exceeds a corresponding threshold and upon determining the at least one of temperature, power, current and voltage exceeds the corresponding threshold communicate an instruction to the charge disconnect module to reduce the power input. The controller can be further configured to receive at least one of a temperature, a power, a current and a voltage of the power brick, determine at least one of the temperature, the power, the current and the voltage exceeds a corresponding modified error threshold value, generate a modified power setting, and communicate the modified power setting to the power brick via the interface. The interface can be associated with a Universal Serial Bus (USB) protocol, the USB protocol can define a plurality of contacts configured to form the at least two data paths, and one of the plurality of contacts can be configured as a control path.

BRIEF DESCRIPTION OF THE DRAWINGS

FIG. 3 is a block diagram illustrating a structure of serial interface according to at least one example embodiment.

DETAILED DESCRIPTION OF THE EMBODIMENTS

Figure 1:
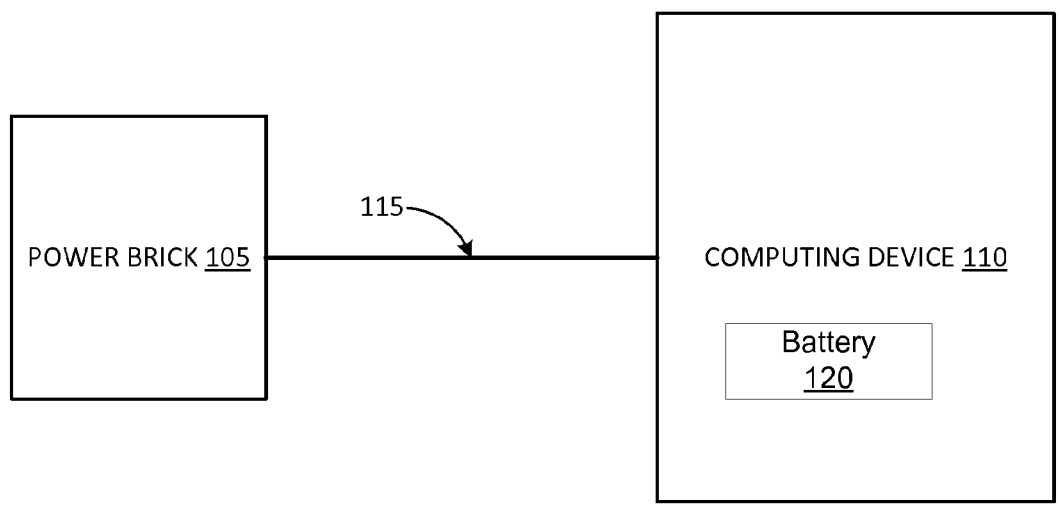
FIGS. 1 and 2 are schematic block diagrams of systems according to at least one example embodiment.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Furthermore, the figures are intended to illustrate the general characteristics of methods and/or structure utilized in certain example embodiments and to supplement the written description provided below. These figures are not, however, to scale and may not precisely reflect the precise structural or performance characteristics of any given embodiment, and should not be interpreted as defining or limiting the range of values or properties encompassed by example embodiments. For example, the structural elements may be reduced or exaggerated for clarity. The use of similar or identical reference numbers in the various drawings is intended to indicate the presence of a similar or identical element or feature.

According to example embodiments, a power brick can communicate with a computing device to communicate data associated with protection thresholds as well as current values that may trigger protection mechanisms based on the protection thresholds. The power brick can take corrective action based on the protection mechanisms. Further, the computing device can communicate with the power brick to ascertain a status of the power brick as relates to the protection thresholds and the current values that may trigger protection mechanisms. The computing device can communicate with the power brick to set power transfer variables as well as change the protection thresholds associated with the power brick protection mechanisms. The computing device and the power brick can also independently take corrective action should an error condition exist.

Figure 2:
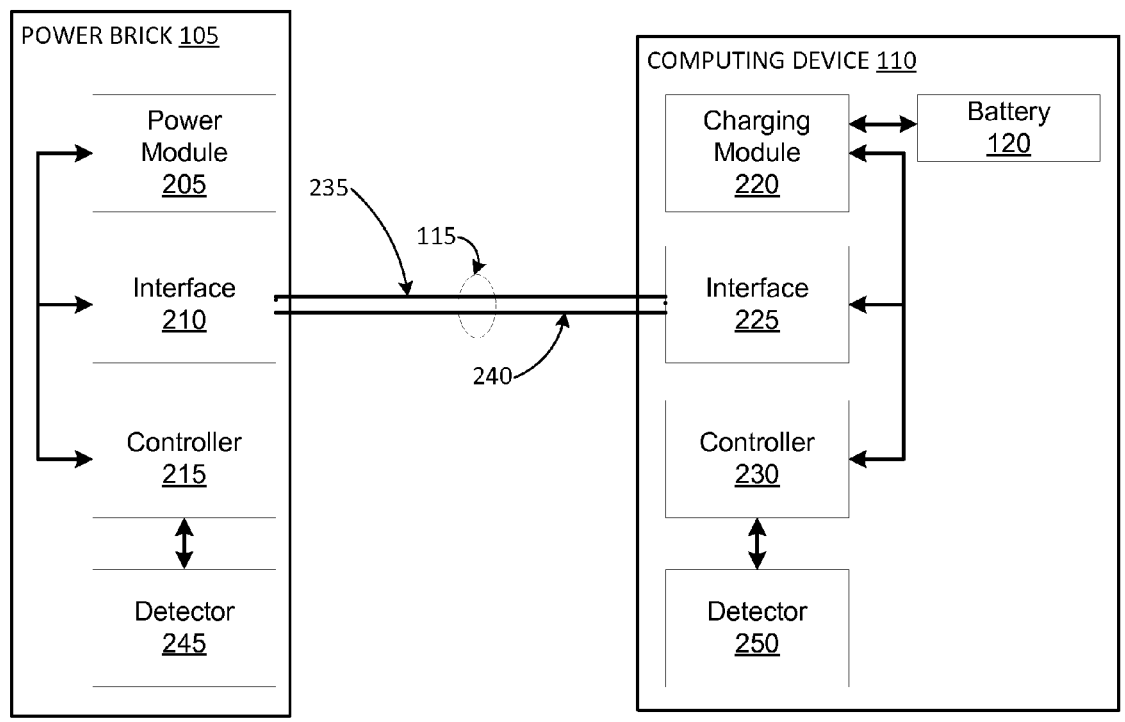

FIGS. 1 and 2 are schematic block diagrams of systems according to at least one example embodiment. As shown in FIG. 1 a system 100 includes a power brick 105 and a computing device 110. The power brick 105 and the computing device 110 are communicatively coupled via a cable 115. The cable 115 is also configured to transfer power from the power brick 105 to the computing device 110. The computing device 110 may be configured charge a battery 120 and/or provide power to the computing device 110 (e.g., to power a CPU, a memory, and the like) using the transferred power.

The computing device 110 may also be configured to communicate an amount of desired power to the power brick 105 via the cable 115. The amount of desired power can include information or data associated with powering the computer device 110, a status of the battery 120 and/or battery charge. The data associated with powering the computer device 110 may include an amount of power to power a CPU, a memory, and the like. The status of the battery 120 and/or battery charge may include a battery capacity, a charge amount, a charging power, a voltage, a current, a temperature, a charging status (e.g., full/charging), an error(s) associated with charging the battery 120 and/or the like. The information or data associated with powering the computer device 110, a status of the battery 120 and/or battery charge may be communicated as a total desired power (e.g., 2 W, 5 W, 7 W and the like).

The power brick 105 may also be configured to communicate a status of the power brick 105 to the computing device 110 via the cable 115. The status of the power brick 105 may include at least one over protection threshold. The at least one over protection threshold may include at least one of an over temperature protection threshold, an over voltage protection threshold, an over current protection threshold, a current, a voltage, a power, a temperature, an error(s) associated with the power brick 105 and/or the like. A threshold may include a limiting condition threshold and/or a trip condition threshold. The power brick 105 may also be configured to communicate the status of the power brick 105 at varying time intervals. For example, the power brick 105 may be configured to communicate the status of the power brick 105 at a first (e.g., less frequent) time interval if a relatively large margin exists between a threshold and a measured value associated with the threshold. For example, the power brick 105 may be configured to communicate the status of the power brick 105 at a second (e.g., more frequent) time interval if a relatively small margin exists between a threshold and a measured value associated with the threshold.

In an example implementation, the computing device 110 can be configured to generate at least one modified error threshold. For example, the computing device 110 can be configured to set and/or modify one or more values associated with the over temperature protection threshold, over voltage protection threshold, over current protection threshold and/or the time interval. The computing device 110 can be configured to communicate the at least one modified error threshold to the power brick 105. The power brick 105 may be configured to use the at least one modified error threshold to protect (e.g., trigger a response based an error condition) the power brick 105 from an error condition.

As shown in FIG. 2 a system 200 includes the power brick 105 and the computing device 110. The power brick 105 and the computing device 110 are communicatively coupled via the cable 115. The power brick 105 includes a power module 205, an interface 210, and a controller 215. The computing device 110 includes a charging module 220, an interface 225, a controller 230, and the battery 120. The cable 115 includes at least one cable 235 configured to transfer power from the power brick 105 to the computing device 110 and at least one cable 240 configured to carry communication signal between the power brick 105 and the computing device 110. The cable 115, including the at least one cable 235 and the at least one cable 240, can be communicatively coupled to (e.g., between) the interface 210 and the interface 225. In some implementations, the cables 235 and 240 are one and the same.

The power module 205 may be configured to convert AC to DC and transform a voltage associated with a wall outlet to a voltage associated with the computing device 110. Converting AC to DC and transforming the voltage associated with the wall outlet can include use of a transformer (not shown). The voltage can be a varying voltage (e.g., between 2.5V and 7.5V, between 5V and 20V and the like). Accordingly, a feedback loop associated with an AC/DC controller (or converter) can be varied in order to vary output voltage while the transformer has fixed tap. Alternatively, or in addition to, the transformer can include a variable voltage tap that is positioned based on a desired voltage. The power module 205 may be configured to communicate conditions or status to the controller 215. For example, the power module 205 may communicate at least one voltage, at least one current and/or at least one power associated with the power module. For example, a voltage associated with the wall outlet, a converted voltage, and/or a current drawn may be communicated. The power module 205 may be configured to transfer DC power to the interface 210. The interface 210 may be configured to couple DC power from the power brick 105 to the at least one cable 235 of the cable 115 (e.g., via a connector of the cable 115).

The interface 210 may be configured to attach the cable 115 (or a connector of the cable 115) to the power brick 105 in order to facilitate communications between the power brick 105 and the computing device 110. The interface 210 may be configured to receive communications from the computing device 110 via the at least one cable 240 of the cable 115. The interface 210 may be configured to communicate the communications to the controller 215). The interface 210 may be configured to transfer DC power from the power brick 105 to the computing device 110 via at least one cable 235 of the cable 115. The cable 115 may include a plurality of cables and/or wires configured for one or more of power transfer (e.g., bus voltage and ground cables) or communicating data (e.g., serial data and/or configuration data).

In one example implementation, the interface 210 may be configured to receive communications from the computing device 110 using a Biphase Mark Coding (BMC) scheme. An example BMC scheme can define digital values (e.g., a '1' or a '0') based on a time interval between a line voltage high value and a line voltage low value. The BMC scheme can also define a beginning and/or an ending of a message. The BMC standard can be associated with configuring USB power delivery. Accordingly, messages based on the BMC standard can communicated over at least one of the plurality of cables and/or wires associated with the cable 115. For example, messages based on the BMC standard can communicated over via the at least one cable 240.

In another example implementation, the interface 210 may be configured to receive communications from the computing device 110 using a serial protocol (e.g., USB 3.0, USB 3.1 and the like). In this example implementation, the interface 210 may be configured as a conduit for sending/receiving serial communications (e.g., using a serial protocol). For example, the interface 210 may be a Universal Serial Bus (USB) connector (e.g., USB 1.0, USB 2.0, USB 3.0, micro-USB, mini-USB, USB type-C and the like).

The controller 215 may be configured to receive information or data associated with powering the computer device 110, a status of the battery 120 and/or battery 120 charge from the computing device 110 via the at least one cable 240 and the interface 210. The information can include a desired voltage, current and/or power setting, an over temperature protection threshold, an over voltage protection threshold, an over current protection threshold, a communication time interval and/or the like. The status of the battery 120 and/or battery 120 charge may include a battery capacity, a charge amount, a charging power, a voltage, a current, a temperature, a charging status (e.g., full/charging), an error(s) associated with charging the battery 120 and/or the like. The controller 215 may be configured to use the desired voltage, current and/or power setting, the over temperature protection threshold, the over voltage protection threshold, the over current protection threshold, the communication time interval and/or the like to modify voltage, current and/or power settings of the power brick. The controller 215 may be configured to use the status of the battery 120 and/or battery 120 charge to modify voltage, current and/or power settings of the power brick that are associated with the powering the computing device and/or charging the battery 120 of the computing device 110.

For example (as feedback loop between power brick 105 and computing device 110), the information can include the power brick 105 output voltage and the computing device 110 input voltage. The cable 115 has resistance, therefore, the cable 115 has voltage drop (e.g., the current×cable resistance). Accordingly, the power brick 105 output voltage can be higher than the computing device 110 input voltage. Different cables can have different resistances, Therefore, a legacy power brick doesn't have methods to account for the voltage drop if the legacy power brick can be connected with different cables. However, in example embodiments, the communication between power brick 105 and computing device 110 can cause the power brick 105 to slightly change its output voltage from no current to full current, so the computing device 110 input voltage will be constant (or in a narrow variable range) from no load to full load for any possible cable.

The controller 215 may be configured to generate signals to protect the power brick 105 should an error (e.g., over current and/or high temperature) be indicated by the status of the battery 120 and/or battery 120 charge. The controller 215 may be configured to disconnect or cause the power module 205 to stop (or reduce) transferring DC power should an error condition be indicated by the status of the battery 120 and/or battery 120 charge. The controller 215 may be configured to disconnect or cause the power module 205 to stop transferring DC power should the status of the battery 120 and/or battery 120 charge indicate the battery is fully charged.

The detector 245 may be configured to monitor and/or detect measurable parameters associated with the power brick 105. For example, the detector 245 may be configured to monitor temperature, power, current and/or voltage associated with the power brick 105. Power, current and/or voltage may also be monitored by the power module 205. The measurable parameter may be communicated to the controller 215 so that the controller 215 can take some action, for example, should the measurable parameter exceed a threshold.

The controller 215 may be configured to receive signals from the power module 205. The signals may indicate at least one of a power, a voltage and a current associated with the power module 205 (and, therefore, the power brick 105). The controller 215 may be configured to disconnect or cause the power module 205 to stop (or reduce) transferring DC power should at least one of the power, the voltage and the current associated with the power module 205 exceed a threshold value. The controller 215 may be configured to disconnect or cause the power module 205 to stop (or reduce) transferring DC power should other signals associated with the power brick 105 (e.g., generated by a temperature detector) indicate a parameter exceeds a threshold value.

The controller 215 may be configured to receive signals from the power module 205. The signals may indicate at least one of a power, a voltage and a current associated with the power module 205 (and, therefore, the power brick 105). The controller 215 may be configured to determine an error condition exists should at least one of the power, the voltage and the current associated with the power module 205 exceed a threshold value. The controller 215 may be configured to modify a value associated with an over temperature protection threshold, an over voltage protection threshold and/or an over current protection threshold as used and/or stored in association with the power module 205. The controller 215 may be configured to communicate a signal(s) to the computing device 110 indicating the error condition(s) exist via the at least one cable 240 and the interface 210. As discussed above, a threshold may be associated with a limiting condition threshold and/or a trip condition threshold.

The charging module 220 may be configured to charge battery 120 using power received from the power brick 105 via the at least one cable 235 of the cable 115. The charging module 220 may be configured to monitor a status of the battery 120. For example, the charging module 220 may measure a voltage, a current, a temperature and the like of the battery. The charging module 220 may be configured to monitor a charging status of the battery 120. For example, the charging module 220 may monitor whether or not the battery 120 is fully charged or charging, an error associated with charging the battery 120 and/or the like.

The interface 225 may be configured to attach the cable 115 (e.g., using a connector of the cable 115) to the computing device 110 in order to facilitate communications between the power brick 105 and the computing device 110. The interface 225 may be configured to send/receive communications from the computing device 110 via the at least one cable 240 of the cable 115. The interface 225 may be configured to communicate the communications to the controller 230. The interface 225 may be configured as a conduit for sending/receiving serial communications (e.g., using a serial protocol). For example, the interface 210 may be a Universal Serial Bus (USB) connector (e.g., USB 1.0, USB 2.0, USB 3.0, micro-USB, mini-USB, type-C USB and the like). The interface 225 may be configured to receive DC power from the power brick 105 via the at least one cable 235 of the cable 115 in order to charge the battery 120.

The detector 250 may be configured to monitor and/or detect measurable parameters associated with charging battery 120 of the computing device 110. For example, the detector 250 may be configured to monitor temperature, power, current and/or voltage associated with charging the battery 120 of the computing device 110. Power, current and/or voltage may also be monitored by the charging module 220. The measurable parameter may be communicated to the controller 230 so that the controller 230 can take some action should the measurable parameter exceed a threshold.

The controller 230 may be configured to communicate a desired voltage, current and/or power setting, an over temperature protection threshold, an over voltage protection threshold, an over current protection threshold, a communication time interval and/or the like. The desired voltage, current and/or power setting may be based on an amount of power desired to charge a battery 120 and/or provide power to the computing device 110 (e.g., to power a CPU, a memory, and the like). In other words, the controller 230, may be configured to negotiate with the power brick based on a desired voltage, current and/or power setting. The desired voltage, current and/or power setting may include at least one of a power, a voltage, and/or a current. The desired voltage, current and/or power setting may be based on a charging mode. For example, a fast charging mode may be based on a high (e.g., higher than normal) voltage and/or current. The controller 230 may change the threshold of the power brick 105 protection limit, and control how much power the computing device needs to avoid over current from the power brick 105 and/or draw maximum power from the power brick 105.

The over temperature protection threshold, the over voltage protection threshold, and/or the over current protection threshold may be based on the desired voltage, current and/or power setting as well. For example, as part of an initial or set-up communication between the power brick 105 and the computing device 110 default values for an over temperature protection threshold, an over voltage protection threshold, and an over current protection threshold associated with the power brick 105 may be communicated to the computing device 110. In an example implementation, the controller 230 may calculate or determine new values for the over temperature protection threshold, the over voltage protection threshold, and/or the over current protection threshold based on these default values and the desired power. For example, the controller may calculate a new limiting condition threshold for the over voltage protection threshold, and/or the over current protection threshold and cause the power brick 105 to change the corresponding threshold values. This may allow the computing device 110 to draw additional power (e.g., during a fast charging mode) without the power brick limiting its power output. Simultaneously, the controller 230 may monitor the power brick 105 temperature to ensure (e.g., take action based on) the power brick 105 does not over heat.

The controller 230 may be configured to receive signals from the charging module 220. The signals may indicate at least one of a power, a voltage and a current associated with the charging module 220 (and, therefore, the battery 120). The controller 230 may be configured to disconnect or cause the charging module 220 to stop (or reduce) charging the battery 120 should at least one of the power, the voltage and the current associated with the charging module 220 exceed a threshold value. The controller 230 may be configured to disconnect or cause the charging module 220 to stop (or reduce) charging the battery 120 should other signals associated with the battery 120 (e.g., generated by a temperature detector) indicate a parameter exceeds a threshold value. The controller 230 may be configured to communicate a status of the battery 120 and/or battery 120 charge to the power brick 105. The status of the battery 120 and/or battery 120 charge may include a battery capacity, a charge amount, a time to full charge, a voltage, a current, a charging power, a temperature, a charging status (e.g., full/charging), an error(s) associated with charging the battery and/or the like.

The controller 230 may be configured to determine an error condition exists should at least one of the power, the voltage and the current associated with the charging module 220 (and, therefore, the battery 120) exceed a threshold value. The controller 225 may be configured to communicate a signal(s) to the power brick 105 indicating the error condition(s) exist via the at least one cable 240 and the interface 225. The controller 225 may be configured to receive a signal(s) from the power brick 105 indicating an error condition(s) exist (at the power brick 105) via the at least one cable 240 and the interface 210. The error condition may indicate a current, a voltage, a power, a temperature and/or the like associated with the power brick 105 have exceeded a threshold. The controller 230 may be configured to disconnect or cause the charging module 220 to stop (or reduce) charging the battery 120 should an error condition exist at the power brick 105 as indicated by the received signal.

FIG. 3 is a block diagram illustrating a structure of serial interface according to at least one example embodiment. As shown in FIG. 3, the serial interface 300 can include a plurality of contacts (or pins) A1 to A12 and B1 to B12. Contact A1, A12, B1 and B12 can be ground contacts. Contacts A2 and A3 (TX1+, TX1−), B2 and B3 (TX1+, TX1−) can form differential pairs in a high speed transmission (TX or transmit end) line or path. Contacts A10 and A11 (RX2−, RX2+), B10 and B11 (RX1−, RX1+) can form differential pairs in a high speed transmission (RX or receive end) line or path. Contacts A4, A9, B4 and B9 can be bus power ($V_{BUS}$) contacts. Contacts A5 and B5 (CC1, CC2) can form a configuration channel, a control channel and/or a control path. Contacts A6, A7, B6 and B7 (D+, D−) can form a differential pair in a transmission line or path. Contacts A8 and B8 can form a channel as a side band use (SBU). As shown in FIG. 3, the serial interface 300 can further include an outer body or shell 305. The outer body or shell 305 can be configured to help hold a mated pair of interfaces. Further, in a receptacle (jack or female) interface, element 310 can be a void in which a plug (or male) interface can be inserted. In another implementation of a plug (or male) interface, element 310 can be a printed circuit board on which the contacts are formed which can be configured to be inserted into a corresponding receptacle.

In an example implementation, contacts A5 and/or B5 (CC1, CC2) can form a configuration channel used to communicate messages associated with power conditions of the power brick 105 and the computing device 110. For example, the contacts A5 and/or B5 (CC1, CC2) can form a configuration channel used to communicate using a BMC scheme. In another example implementation, the serial interface 300 includes at least two data paths. For example, contacts A6, A7, B6 and B7 (D+, D−) can form a data path. Contacts A2 and A3 (TX1+, TX1−), B2 and B3 (TX1+, TX1−) can form another data path. Contacts A10 and A11 (RX2−, RX2+), B10 and B11 (RX1−, RX1+) can yet another data path. Further, contacts A8 and B8 (SBU) can form still another data path. In an example implementation, the data paths associated with contacts A6, A7, B6 and B7 (D+, D−), contacts A2 and A3 (TX1+, TX1−), B2 and B3 (TX1+, TX1−), and contacts A10 and A11 (RX2−, RX2+), B10 and B11 (RX1−, RX1+) can be associated with the serial protocol of the serial interface 300 (e.g., USB 2.0, USB 3.0, USB 3.1, and/or the like). Further, one of the at least two data paths can be used for other signals or data. For example, contacts A8 and B8 (SBU) can be used for other signals or data. In other words, contacts A8 and B8 (SBU) can be used for non-usb protocol data and/or signals.

In an example implementation, interface 210 and interface 225 can be serial interfaces. Accordingly, interface 210 and interface 225 can include the structure of serial interface 300. As such, the power brick 105 and the computing device 110 can be configured to communicate using the structure (and the BMC scheme and/or serial protocols) of serial interface 300. This communication can be implemented as feedback processing or a feedback loop between the power brick 105 and the computing device 110. In other words, the power brick 105 and the computing device 110 can exchange information that can be configured to adjust (or cause an adjustment in) charging provided by the power brick 105. For example, the feedback loop can be configured to adjust (or cause an adjustment in) current and/or voltage provided by the power brick 105 during different stages of charging of a battery included in the computing device 110 (e.g., battery 120). The different stages can be, for example, (1) upon initial connection the battery's (of the computing device 110) voltage quickly increases, (2) the voltage peaks and current from the power brick 105 begins to decrease, (3) upon detecting the battery is fully charged and the power brick 105 reduces, removes or disconnects the current off from the computing device 110 completely, and (4) A standby mode where only a top-up charge is supplied upon determining the battery drops below a specified voltage.

The computing device 110 can communicate information (e.g., stage of charge) that can be used by the power brick 105 using a serial interface 300. The feedback loop can also be configured to adjust (or cause an adjustment in) temperature for the power brick 105 that can adjust (or cause an adjustment in) charging based on a change in temperature. Further, the feedback loop can be configured to exchange information that can be used to adjust (or cause an adjustment in) charging provided by the power brick 105 should a not fully plugged in adapter (e.g., associated with serial interface 300) be detected. The feedback loop can communicate over one or more of the high speed transmission path (TX1/TX2, RX1/RX2), the differential pair (D+/D−) transmission path and/or the SBU (SBU1/SBU2) transmission path.

Figure 4:
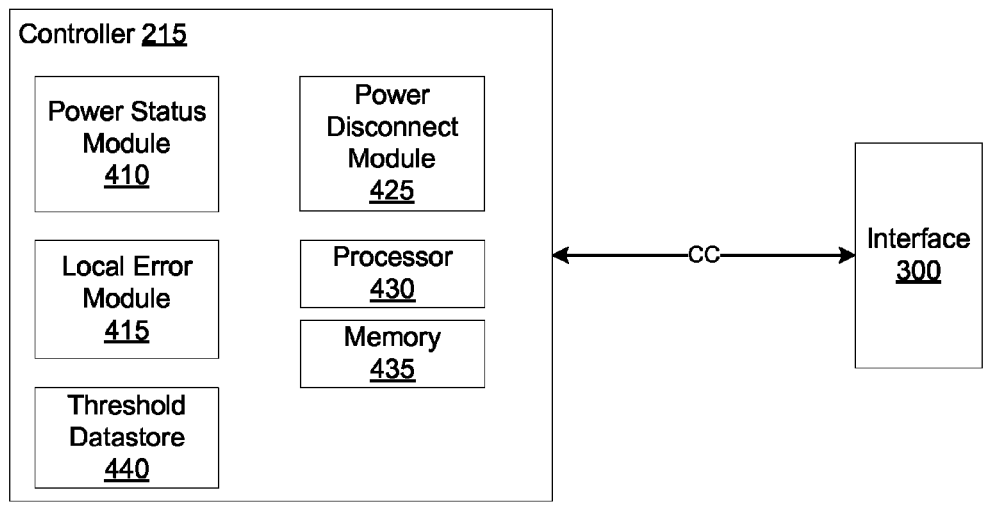
FIGS. 4 and 5 are schematic block diagrams of controllers according to at least one example embodiment.
Figure 5:
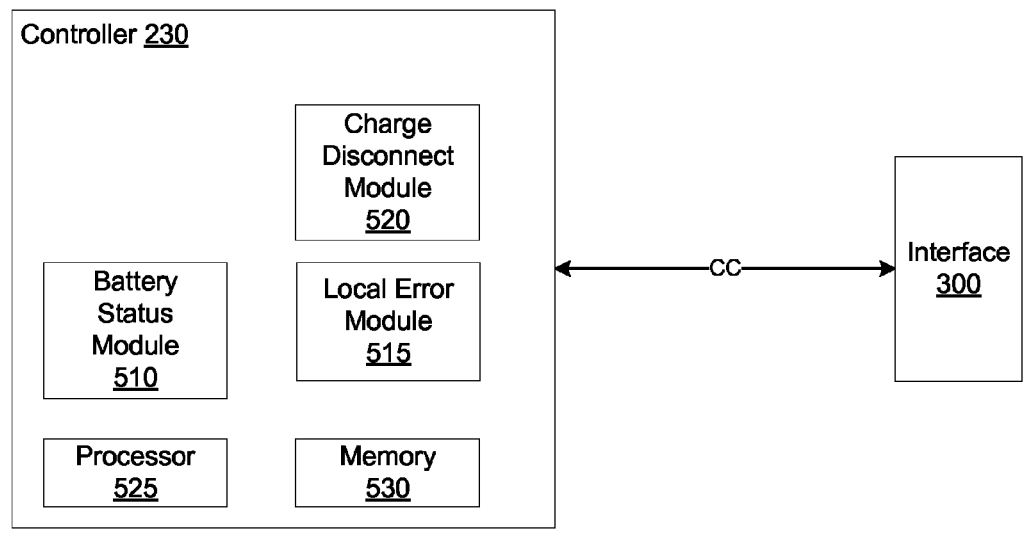

FIGS. 4 and 5 are schematic block diagrams of controllers according to at least one example embodiment. As shown in FIG. 4, the controller 215 (of the power brick 105) includes, a power status module 410, a local error module 415, a power disconnect module 425, a processor 430, a memory 435 and a threshold datastore 440. The power status module 410 may be configured to receive information related to the powering of the computing device 110, battery 120 status and/or charge status of the battery 120. The information related to the status and/or charge status of battery 120 may include a battery capacity, a charge amount, a time to full charge, a charging power, a charging status (e.g., full/charging), an error(s) associated with charging the battery and/or the like. The information related to the powering of the computing device 110 may include an amount of power (e.g., a desired or negotiated power).

The local error module 415 may be configured to receive measurable data (e.g., temperature, current, voltage, power) regarding the power brick 105 and determine if at least one of the measurable data exceeds a threshold value. If at least one of the measurable data exceeds a threshold value, the local error module 415 may be configured to output an error status to, for example, the power disconnect module. The measurable data may be received from at least one of the power module 205 and the detector 310.

The power disconnect module 425 may be configured to disconnect or cause the power module 205 to stop (or reduce) transferring DC power. For example, the power disconnect module 425 may receive an indicator from at least one of the local error module 415 and the power status module 410. The indicator may indicate a condition that can be corrected by reducing power output by the power brick 105. Accordingly, the power disconnect module 425 may instruct (e.g., change a setting associated with) the power module 205 to reduce an output power thus, for example, reducing temperature, current and/or voltage. The indicator may indicate a condition that can be corrected by stopping or disconnecting power output by the power brick 105. Accordingly, the power disconnect module 425 may instruct (e.g., change a setting associated with) the power module 205 to stop outputting power thus, for example, eliminating an over current and/or over voltage condition and/or a high temperature condition.

The processor 430 may be configured to execute instructions. For example, processor 430 can be associated with any of the components of the controller 215, and can be used for execution of any of the operations of the controller 215. The memory 435 may be configured to store instructions (e.g., as code segments) and/or data associated with implementing functions associated with the controller 215 and/or the power brick 105.

The threshold datastore 440 may be configured to store threshold values for use by the local error module 415. The threshold datastore 440 may be a standalone memory, included in the memory 435 and/or as an element of the local error module 415. In an example implementation, the threshold datastore 440 includes limiting condition threshold value(s) and/or a trip condition threshold value(s). The threshold values may include an over temperature protection threshold, an over voltage protection threshold, an over current protection threshold and/or the like. In an example implementation, the threshold datastore 440 includes default threshold values and a protection value of the power brick or current use threshold values. For example, the local error module 415 may be configured to read and use the protection value(s) of the power brick. For example, the controller 215 may be configured to reset the protection value(s) of the power brick to the default threshold values. For example, the controller 215 may be configured to reset the protection value(s) of the power brick to the default threshold values upon determining a computing device (e.g., computing device 110) has been disconnected from the power brick 105.

As shown in FIG. 4, the controller 215 can be coupled to the interface 300 via path CC. However, in an alternate implementation, SBU1/SBU2, paths TX1/TX2 and RX1/RX2 and/or path Vbus (e.g., as a high frequency signal) can be used. Accordingly, communications between the computing device 110 and the power brick 105 related to operations of and/or detections by one or more of the power status module 410, the local error module 415, and/or the power disconnect module 425 can be communicated via the CC path. Further, in an alternate implementation, communications between the computing device 110 and the power brick 105 related to operations of and/or detections by one or more of the power status module 410, the local error module 415, and/or the power disconnect module 425 can be communicated via one of the SBU1/SBU2, TX1/TX2 and RX1/RX2 and/or Vbus paths.

As shown in FIG. 5, the controller 230 (of the computing device 110) includes a battery status module 510, a local error module 515, a charge disconnect module 520, a processor 525 and a memory 530. The battery status module 510 may be configured to determine information related to the status and/or charge status of the battery 120. The information related to the status and/or charge status of battery 120 may include a battery capacity, a charge amount, a time to full charge, a charging power, a charging status (e.g., full/charging), an error(s) associated with charging the battery and/or the like. The battery status module 510 may generate indicators based on the information related to the status and/or charge status of the battery 120. The indicators may be subsequently communicated to the power brick 105 via interface 300. In some implementations, the battery status module 510 may be configured to calculate a value. For example, the battery status module 510 may calculate a battery capacity percentage based on a charge amount and a battery capacity.

The local error module 515 may be configured to receive measurable data (e.g., temperature, current, voltage, power) regarding the computing device 110 and/or the battery 120 and determine if at least one of the measurable data exceeds a threshold value. If at least one of the measurable data exceeds a threshold value, the local error module 515 may be configured to output an error status to, for example, the charge disconnect module. If at least one of the measurable data exceeds a threshold value, the local error module 515 may be configured to output an error status for communication to, for example, the power brick 105 via interface 300.

The charge disconnect module 520 may be configured to disconnect or cause the charging module 220 to stop (or reduce) charging of the battery 120. For example, the charge disconnect module 520 may receive an indicator from at least one of the local error module 515 and the battery status module 510. The indicator may indicate a condition that can be corrected by reducing charging power to the battery 120. Accordingly, the charge disconnect module 520 may instruct (e.g., change a setting associated with) the charging module 220 to reduce an output power thus, for example, reducing temperature, current and/or voltage of for example the battery 120. The indicator may indicate a condition that can be corrected by stopping or disconnecting the battery 120 from a charge (e.g., charge voltage). Accordingly, the charge disconnect module 520 may instruct (e.g., change a setting associated with) the charging module 220 to stop outputting power thus, for example, eliminating an over current and/or over voltage condition and/or a high temperature condition.

As shown in FIG. 5, the controller 230 can be coupled to the interface 300 via path CC. However, in an alternate implementation, SBU1/SBU2, paths TX1/TX2 and RX1/RX2 and/or path Vbus (e.g., as a high frequency signal) can be used. Accordingly, communications between the computing device 110 and the power brick 105 related to operations of and/or detections by one or more of the battery status module 510, the local error module 515 and/or the charge disconnect module 520 can be communicated via the CC path. Further, in an alternate implementation, communications between the computing device 110 and the power brick 105 related to operations of and/or detections by one or more of the battery status module 510, the local error module 515 and/or the charge disconnect module 520 can be communicated via one of the SBU1/SBU2, TX1/TX2 and RX1/RX2 and/or Vbus paths.

The processor 525 may be configured to execute instructions. For example, processor 525 can be associated with any of the components of the controller 230, and can be used for execution of any of the operations of the controller 230. The memory 530 may be configured to store instructions (e.g., as code segments) and/or data associated with implementing functions associated with the controller 230 and/or the computing device 110.

As may be appreciated, the processor (or at least one processor) 430 and/or 525 may be formed on a substrate and may be utilized to execute instructions stored on the memory (or at least one memory) 435 and/or 530, so as to thereby implement the various features and functions described herein, or additional or alternative features and functions. Of course, the processor 430 and/or 525 and the memory 435 and/or 530 may be utilized for various other purposes. In particular, it may be appreciated that the memory 435 and/or 530 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, the memory 435 and/or 530.

The memory 435 and/or 530 stores information within the power brick 105 and/or the computing device 110. In one implementation, the memory 435 and/or 530 is a volatile memory unit or units. In another implementation, the memory 435 and/or 530 is a non-volatile memory unit or units. The memory 530 may also be another form of computer-readable medium, such as a magnetic or optical disk. The memory 435 and/or 530 may be a non-transitory computer readable medium.

Figure 6:
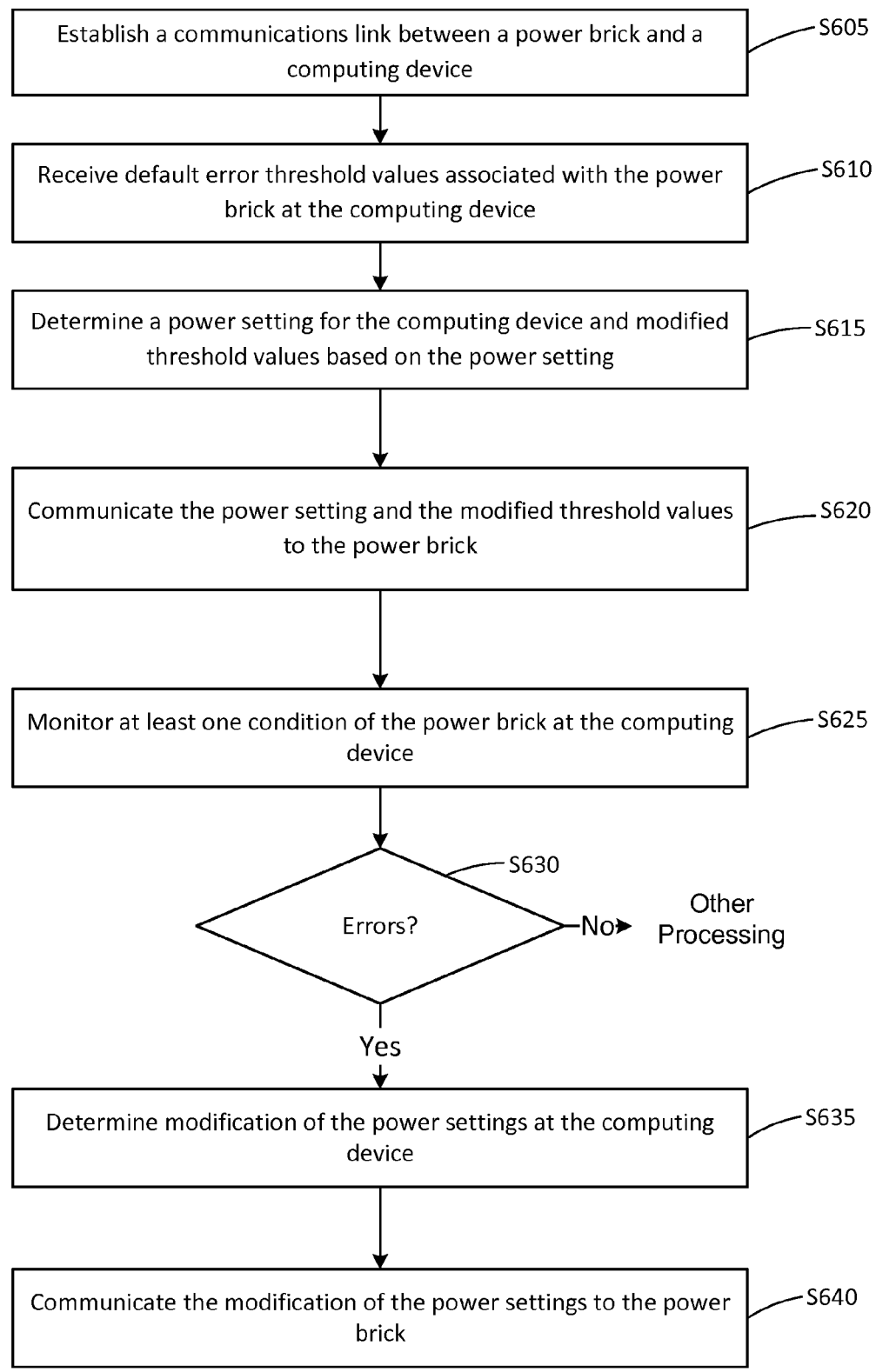
FIGS. 6 and 7 are flowcharts of methods according to at least one example embodiment.
Figure 7:
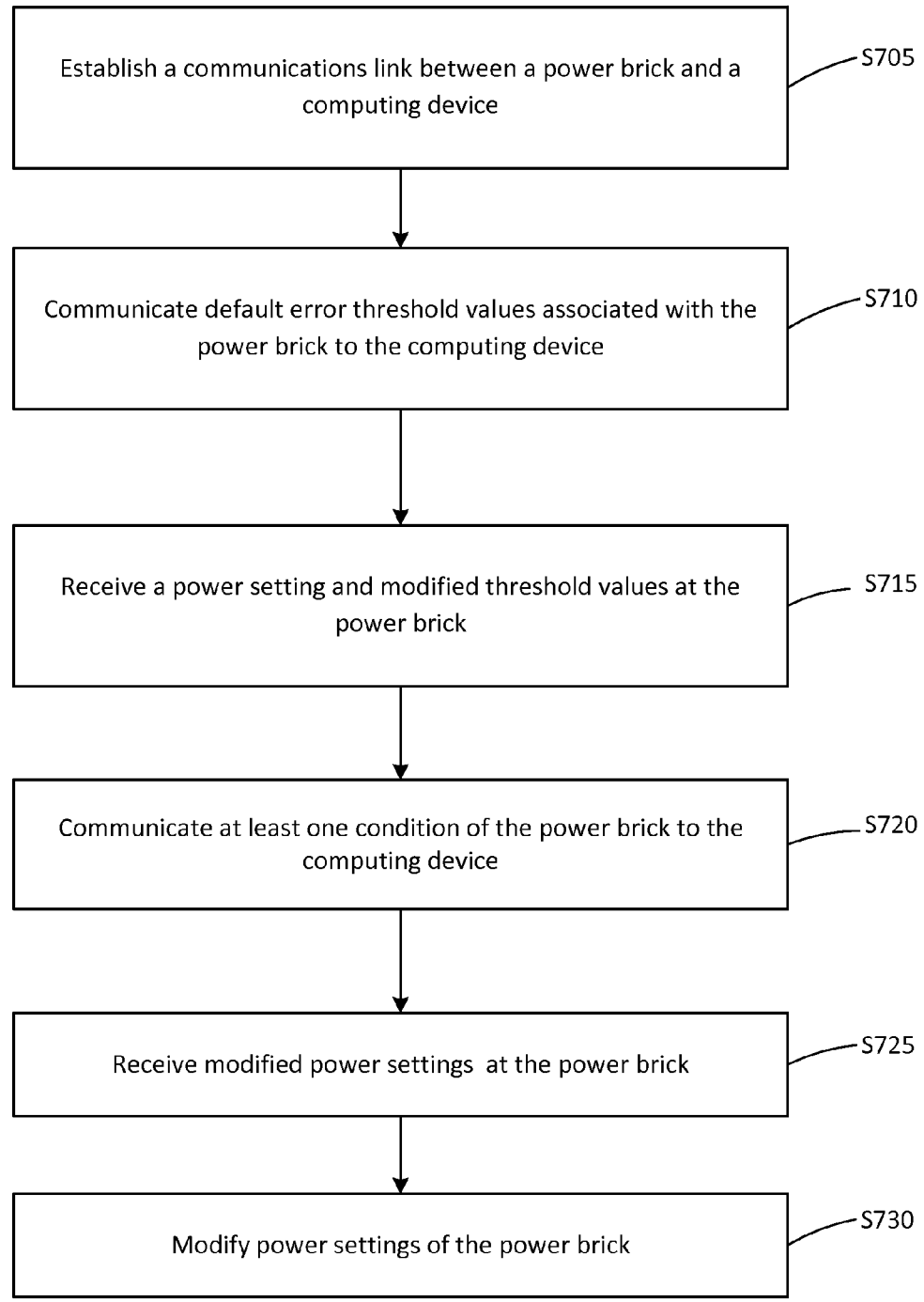

FIGS. 6 and 7 are flowcharts of methods according to example embodiments. The steps described with regard to FIGS. 6 and 7 may be performed due to the execution of software code stored in a memory (e.g., at least one memory 435 and/or 530) associated with an apparatus (e.g., as shown in FIGS. 1 and 2) and executed by at least one processor (e.g., at least one processor 430 and/or 525) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 6 and 7.

As shown in FIG. 6, in step S605 a communications link is established between a power brick and a computing device. In an example implementation, contacts A5 and/or B5 (CC1, CC2) can form a configuration channel used to communicate messages associated with power conditions of the power brick 105 and the computing device 110. For example, the contacts A5 and/or B5 (CC1, CC2) can form a configuration channel used to communicate using a BMC scheme. The communications link can be established using the BMC scheme over contact CC1 or CC2. In an alternate implementation, a serial communications link can be established between the computing device 110 and the power brick 105. In an example implementation, the serial communications link can be established using serial interface 300. For example, the serial communications link can be established using a serial protocol (e.g., USB 2.0, 3.0, 3.1 and the like) between the computing device 110 and the power brick 105 via the SBU1/SBU2 path, the TX1/TX2 and RX1/RX2 path and/or the Vbus path.

In step S610 default error threshold values associated with the power brick are received at the computing device. For example, as part of an initial or set-up communication between the power brick 105 and the computing device 110 default values for an over temperature protection threshold, an over voltage protection threshold, and an over current protection threshold associated with the power brick 105 may be communicated to the computing device 110.

In step S615 a voltage, current and/or power setting for the computing device and modified threshold values based on the voltage, current and/or power setting are determined. In an example implementation, the power brick 105 can have a rating of 7.5 W at 5V and 1.5 A. This rating can be a conservative rating. In other words, the power brick 105 could operate at a higher output (e.g., 10%, 15%, 20% and the like higher) than 7.5 W without damaging the power brick. For example, in a low temperature environment, the power brick 105 could operate at a higher output. For example, for a short period of time, the power brick 105 could operate at a higher output. For example, the power brick 105 could operate at a continual higher output based on a design margin.

Accordingly, the voltage, current and/or power setting (e.g., an amount to operate the computing device 110 and charge the battery 120) could be determined as, for example, 10 W. For example, the computing device 110 could cause the power brick 105 to operate at 10 W, 5V and 2 A. The received default over current protection threshold could be 1.3 A to trigger a limiting action and 1.5 A to cause a tripping action. Accordingly, the modified threshold for the over current protection threshold could be determined as, for example, 2.1 A to trigger a limiting action and 2.5 A to cause a tripping action. The voltage, current and/or power setting for the computing device and modified threshold values based on the voltage, current and/or power setting could be stored in, for example, memory 530.

In step S620 the voltage, current and/or power setting and the modified threshold values are communicated to the power brick. For example, the controller 230 could convert the values associated with each of the voltage, current and/or power setting and the modified threshold values to the BMC scheme and communicate the converted values to the power brick 105 via the CC contact or path. Alternatively, the values associated with each of the voltage, current and/or power setting and the modified threshold values could be written in a data packet and communicated using a serial protocol.

In step S625 at least one condition of the power brick is monitored at the computing device. For example, the controller 230 could receive a temperature (current or voltage) of the power brick 105 (via the CC contact or path). The controller 230 could receive the temperature of the power brick 105 at a regular time interval. The temperature (current or voltage) may be compared to a corresponding threshold value to determine if an error exists. For example, the temperature could be compared to the default over temperature protection threshold or a modified over temperature protection threshold. If the temperature exceeds the over temperature protection threshold, an error can be determined to exist. If no errors exist, ("No" in step S630) some other processing is performed. Otherwise ("Yes" in step S630), processing continues to step S635.

In step S635 a modification of the voltage, current and/or power settings are determined at the computing device. In one example implementation, the controller 230 could reduce the previously determined voltage, current and/or power setting. For example, the controller 230 could determine a modified voltage, current and/or power setting as 9 W by reducing the current. For example, the controller 230 could determine a modified voltage, current and/or power setting as the rated voltage, current and/or power setting. Alternatively (or in addition to), the controller 230 may disconnect or cause the charging module 220 to stop (or reduce) charging the battery 120 which, in turn, should reduce the load on the power brick 105. The controller 230 may be configured to wait a period of time (and/or a period of time after the temperature drops below the over temperature protection threshold) and may reconnect or cause the charging module 220 to recommence charging the battery 120.

In step S640 the modification of the voltage, current and/or power settings is communicated to the power brick. For example, the controller 230 could convert the values associated with the modified voltage, current and/or power setting to the BMC scheme and communicate the converted values to the power brick 105 via the CC contact or path. Alternatively, the values associated with the modified voltage, current and/or power setting could be written in a data packet and communicated using a serial protocol.

As shown in FIG. 7, in step S705 a communications link is established between a power brick and a computing device. In an example implementation, contacts A5 and/or B5 (CC1, CC2) can form a configuration channel used to communicate messages associated with power conditions of the power brick 105 and the computing device 110. For example, the contacts A5 and/or B5 (CC1, CC2) can form a configuration channel used to communicate using a BMC scheme. The communications link can be established using the BMC scheme over contact CC1 or CC2. In an alternate implementation, a serial communications link can be established between the computing device 110 and the power brick 105. In an example implementation, the serial communications link can be established using serial interface 300. For example, the serial communications link can be established using a serial protocol (e.g., USB 2.0, 3.0, 3.1 and the like) between the computing device 110 and the power brick 105 via the SBU1/SBU2 path, the TX1/TX2 and RX1/RX2 path and/or the Vbus path.

In step S710 default error threshold values associated with the power brick are communicated to the computing device. For example, as part of an initial or set-up communication between the power brick 105 and the computing device 110 default values for an over temperature protection threshold, an over voltage protection threshold, and an over current protection threshold associated with the power brick 105 may be communicated to the computing device 110 from the power brick 105.

In step S715 a voltage, current and/or power setting and modified threshold values are received by the power brick. For example, the controller 215 could receive the voltage, current and/or power setting and the modified threshold values in the BMC scheme and via the CC contact or path. Alternatively, the values associated with each of the voltage, current and/or power setting and the modified threshold values could be received as a data packet communicated using a serial protocol. In an example implementation, the modified threshold values are stored in the threshold datastore 440 as current use threshold values. For example, the local error module 415 may be configured to read and use the current use threshold values. For example, the controller 215 may be configured to reset the current use threshold values to the default threshold values. Further, the controller 215 may be configured to reset the current use threshold values to default threshold values upon determining a computing device (e.g., computing device 110) has been disconnected from the power brick 105.

In addition, the power brick 105 may generate power based on the received voltage, current and/or power setting. The power brick 105 may transfer the generated power to the computing device 110.

In step 720 at least one condition of the power brick is communicated to the computing device. For example, a temperature, a current and/or a voltage could be measured by the power brick 105. Values associated with one or more of the temperature, the current and/or the voltage could be converted to the BMC scheme by the controller 215 and the converted values could be communicated to the computing device 110 via the CC contact or path. Alternatively, the values associated one or more of the temperature, the current and/or the voltage could be written in a data packet and communicated using a serial protocol.

In step S725 modified voltage, current and/or power settings are received at the power brick. For example, the controller 215 could receive the modified voltage, current and/or power setting in the BMC scheme and via the CC contact or path. Alternatively, the values associated with each of the modified voltage, current and/or power setting could be received as a data packet communicated using a serial protocol. In an example implementation, the modified voltage, current and/or power setting is based on the temperature, the current and/or the voltage measured by the power brick 105 and communicated to the computing device 110.

In step S730, voltage, current and/or power settings of the power brick are modified. The controller 215 may be configured to disconnect or cause the power module 205 to reduce (or stop) transferring DC power based on the received modified voltage, current and/or power settings.

According to example implementations, settings associated with a power brick can be modified by (or caused to be modified by) a coupled computing device. This can allow the computing device to be powered by the power brick at various voltage, current and/or power settings. In addition, possible error conditions associated with the power brick can be monitored by the computing device. This can allow the computing device to modify the voltage, current and/or power settings of the power brick such that the error condition can be mitigated. As a result, the power brick can continue to provide power to the computing device at a non-error causing setting, Thus, improving a users experience associated with the computing device (e.g., the computing device can acquire enough power to operate).

For example, the computing device (e.g., computing device 110) could negotiate a voltage, current and/or power setting with a power brick (e.g., power brick 105) that exceeds a rated voltage, current and/or power setting of the power brick. The negotiation can include determining, by the computing device, modified error threshold values for use by the power brick. The result could be the power brick providing power at the voltage, current and/or power setting that includes providing, for example, a power and a current that exceeds the specifications the power brick. The power brick can then communicate measured condition(s) (e.g., temperature) to the computing device. If the measured condition(s) exceed some threshold the computing device can cause the power brick to reduce power output. For example if temperature exceeds a default or modified error threshold value, the computing device can cause the power brick to reduce power output. The computing device could cause the power brick to reduce power output by, for example, negotiating a lower voltage, current and/or power setting or modifying a current limiting error threshold value. As a result, the power brick can continue to provide power to the computing device while being protected from a potentially damaging condition.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a controller, a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether that particular combination has been specifically enumerated in the accompanying claims at this time.

What is claimed is:

1. A power brick comprising:
    a power module configured to convert AC to DC;
    an interface coupled to a computing device and configured to communicate with the computing device; and
    a controller configured to:
       receive a modified power setting and at least one modified error threshold value associated with the computer device via the interface,
       control a modification of a power setting associated with the power module, and
       control a modification of a protection value of the power brick based on the at least one modified error threshold value.

2. The power brick of claim 1, wherein the controller is configured to transmit at least one default error threshold value associated with the power brick to the computing device via the interface.

3. The power brick of claim 1, wherein the controller is configured to use a Biphase Mark Coding (BMC) scheme when communicating with the computing device via the interface.

4. The power brick of claim 1, further comprising:
    a detector configured to monitor at least one of temperature, power, current or voltage associated with the power brick and configured to communicate at least one of the temperature, the power, the current and the voltage to the controller, wherein the controller is further configured to reduce a power output of the power brick upon determining at least one of the temperature, the power, the current and the voltage exceeds a corresponding modified error threshold value.

5. The power brick of claim 1, wherein the controller includes:
    a power disconnect module configured to reduce a power output of the power brick, and
    a local error module configured to determine at least one of a temperature, a power, a current and a voltage of the power brick exceeds a corresponding threshold and upon determining the at least one of temperature, power, current and voltage of the power brick exceeds the corresponding threshold communicate an instruction to the power disconnect module to reduce the power output.

6. The power brick of claim 1, wherein
    the power setting exceeds a rated power setting of the power brick, and
    the at least one modified error threshold value is based on enabling the power brick to output power that exceeds the rated power setting.

7. The power brick of claim 1, wherein
    the interface is associated with a Universal Serial Bus (USB) protocol,
    the USB protocol defines a plurality of contacts configured to form the at least two data paths, and
    one of the plurality of contacts is configured as a control path.

8. The power brick of claim 1, wherein the controller is further configured to reset the protection value of the power brick to a default value upon determining the computing device has been disconnected from the power brick.

9. A method comprising:
    receiving a power setting and at least one modified error threshold value associated with a computer device;
    controlling a modification of a power setting associated with a power brick based on the power setting; and
    controlling a modification of a protection value of the power brick based on the at least one modified error threshold value.

10. The method of claim 9, further comprising:
    monitoring at least one of a temperature, a power, a current and a voltage associated with the power brick; and
    reducing a power output of the power brick upon determining at least one of the temperature, the power, the current and the voltage exceeds a corresponding modified error threshold value.

11. The method of claim 9, further comprising:
    monitoring at least one of a temperature, a power, a current and a voltage associated with the power brick; and
    communicating at least one of the temperature, the power, the current and the voltage to the computing device communicatively coupled to the power brick.

12. The method of claim 9, further comprising:
    receiving a modified power setting by the power brick; and
    reducing a power output of the power brick based on the modified power setting.

13. The method of claim 9, wherein
    the power setting exceeds a rated power setting of the power brick, and
    the at least one modified error threshold value is based on enabling the power brick to output power that exceeds the rated power setting.

14. The method of claim 9, further comprising resetting the protection value of the power brick to a default value upon determining the computing device has been disconnected from the power brick.

15. A computing device comprising:
    an interface coupled to a power brick and configured to communicate with the power brick; and
    a controller configured to:
       determine a power setting associated with providing power to the computing device,
       determine at least one modified error threshold value for the power brick based on the power setting, and
       control communicating the power setting and the at least one modified error threshold value to the power brick via the interface.

16. The computing device of claim 15, wherein the controller is configured to receive at least one default error threshold value associated with the power brick via the interface.

17. The computing device of claim 15, wherein the controller is configured to use a Biphase Mark Coding (BMC) scheme when communicating with the power brick via the interface.

18. The computing device of claim 15, wherein the controller includes:
- a charge disconnect module configured to reduce a power input to a battery, and
- a local error module configured to determine at least one of a temperature, a power, a current and a voltage associated with charging the battery exceeds a corresponding threshold and upon determining the at least one of temperature, power, current and voltage exceeds the corresponding threshold communicate an instruction to the charge disconnect module to reduce the power input.

19. The computing device of claim 15, wherein the controller is further configured to:
- receive at least one of a temperature, a power, a current and a voltage of the power brick,
- determine at least one of the temperature, the power, the current and the voltage exceeds a corresponding modified error threshold value,
- generate a modified power setting, and
- communicate the modified power setting to the power brick via the interface.

20. The computing device of claim 15, wherein the interface is associated with a Universal Serial Bus (USB) protocol, the USB protocol defines a plurality of contacts configured to form the at least two data paths, and one of the plurality of contacts is configured as a control path.

* * * * *